United States Patent [19]

Akimoto

[11] 4,042,230

[45] Aug. 16, 1977

[54] DYNAMIC ABSORBER WITH PNEUMATIC SPRINGS

[75] Inventor: Masao Akimoto, Hiratsuka, Japan

[73] Assignee: The Yokohama Rubber Company Ltd., Tokyo, Japan

[21] Appl. No.: 624,909

[22] Filed: Oct. 22, 1975

[51] Int. Cl.$^2$ ............................................... F16F 9/02
[52] U.S. Cl. ...................................... 267/136; 188/1 B
[58] Field of Search ............... 267/137, 136, 122, 123, 267/125, 113, 19, 20; 188/1 B; 248/20, 8, 22, 358 R; 181/.5 H, .5 M, .5 W; 74/574

[56] References Cited

U.S. PATENT DOCUMENTS

| 2,819,775 | 1/1958 | Everett | 188/1 B |
| 2,917,246 | 11/1975 | Gartner et al. | 267/136 |

*Primary Examiner*—James B. Marbert
*Attorney, Agent, or Firm*—Armstrong, Nikaido & Marmelstein

[57] ABSTRACT

The disclosure is directed to a dynamic absorber with pneumatic springs, which absorber is adapted for absorbing a vibration of a machine caused by an excitation force generated in the machine. The dynamic absorber comprises a pair of pneumatic springs disposed to be spaced apart from one another along a preselected spring action line, a weight means supported between the pair of pneumatic springs and capable of vibrating, and a pressurized air pipeline circuit for introducing a pressurized air into the absorber and for exhausting the pressurized air from the absorber. The internal pressure of the pneumatic springs is remotely and adjustably regulated by a pressure regulating valve disposed in the pressurized air pipeline circuit.

12 Claims, 14 Drawing Figures

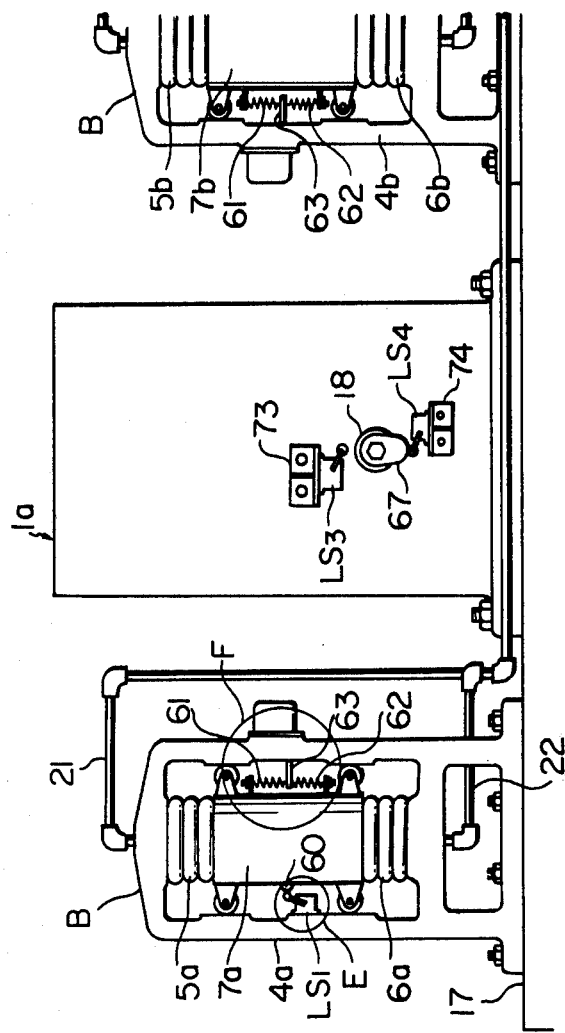

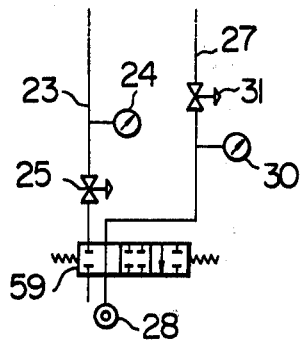
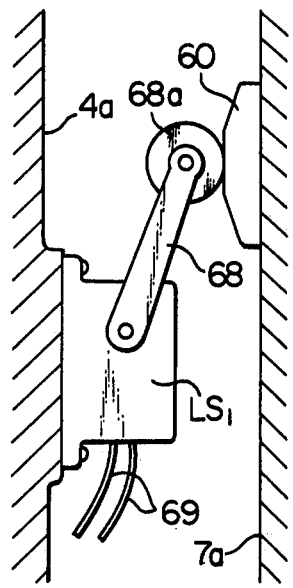
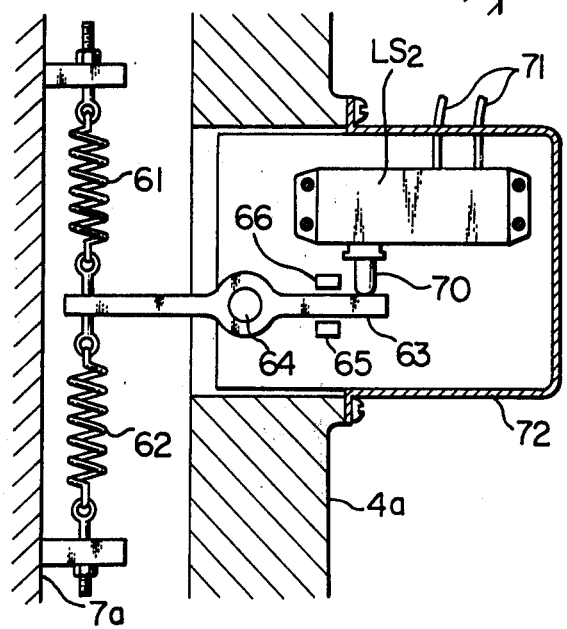

DYNAMIC ABSORBER WITH PNEUMATIC SPRINGS

DESCRIPTION OF THE INVENTION

The present invention relates to a dynamic absorber with pneumatic springs, which is used for absorbing vibrations occurring in diverse kinds of machines.

Two methods of absorbing the vibration of a machine are known. One of these methods is to mount a machine on support springs capable of absorbing vibrations of the machine. The other method is to cause resonant vibration of a spring supported mass attached to a machine when the machine is vibrated by an excitation force generated in the machine. For carrying out the latter method, it is known to use a dynamic absorber provided with a spring supported mass. In the known dynamic absorber, the mass is supported by metal or rubber springs so as to form an auxiliary vibration system, and the natural frequency of the auxiliary vibration system is so adjusted that it corresponds to the frequency of a vibratory excitation force which causes vibration of a machine to which the dynamic absorber is attached. When such adjustment is achieved, the amplitude of the vibration of the machine is minimized, and simultaneously the vibration of the spring supported mass of the dynamic absorber is carried out with a relatively large amplitude. As a result, the force transmitted to the foundation on which the machine is mounted can be minimized. When the frequency of the excitation force changes, the natural frequency of the auxiliary vibration system of the dynamic absorber must be changed responsively. It will be understood that the change in the natural frequency can be attained by changing the spring constants of the springs which support the mass of the known dynamic absorber. However, in changing the natural frequency, the metal or rubber springs used in the known dynamic absorber result in the requirement that either the springs be replaced with other springs having different spring constants or the performance of an appropriate adjusting operation by an operator on an adjusting platform adjacent to the machine to which the dynamic absorber is attached. Thus, if the frequency of the excitation force generated in a machine and causing the vibration of the machine changes frequently during the operation of the machine, replacement of the springs of the dynamic absorber or the adjusting operation of the spring constants of the springs of the dynamic absorber must frequently be performed by the operator. This results in the operator being required to frequently go to the adjusting platform of the machine to which the dynamic absorber is attached and, also, brings about a decrease in the operation efficiency of the machine, since the machine must be stopped during the adjusting operation. Further, in many machines rigidly fixed on a foundation, while the vibration of the machine caused by the excitation force generated in the machine ranges in amplitude from only a few microns up to only a few tens of microns, the force transmitted to the foundation often reaches more than several tens of tons. Under this condition, it often occurs that the attachment of the known dynamic absorber does not contribute to preventing the transmission of the excitation force to the foundation on which the machine is mounted. This is because the spring supported mass of the known dynamic absorber cannot be vibrated at so large amplitude as to cancel the large excitation force reaching more than several tens of tons.

Accordingly, it is an object of the present invention to provide a dynamic absorber in which the natural frequency of the auxiliary vibration system of the dynamic absorber is easily and remotely adjusted by an operator without the necessity of the operator approaching the dynamic absorber attached to the machine.

It is another object of the present invention to provide a dynamic absorber by which the vibration of a machine can be absorbed even in the cases where the machine is rigidly fixed to a foundation and where the amplitude of the vibration of the machine is very small.

It is further object of the present invention to provide a dynamic absorber which is used not exclusively but preferably for absorbing vibrations of machines, such as high speed presses, compressors and looms, in which machines the wave form of the vibrations is very simple.

These and other objects, features, and advantages of the present invention will become apparent from the ensuing description with reference to several preferred embodiments shown in the accompanying drawings wherein:

FIG. 10 is a partial and schematic view of the fourth embodiment of the application of dynamic absorbers of the present invention, which absorbers are provided with means for automatically adjusting the internal pressures of the pneumatic springs;

FIG. 11 is a partial pipeline diagram employed in the fourth embodiment of FIG. 10;

FIGS. 13 and 14 are enlarged detailed views of the parts E and F of FIG. 10, respectively.

Figure 1:
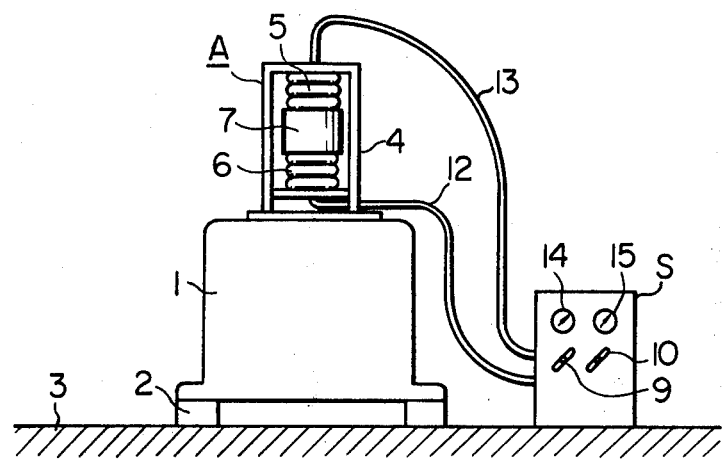
FIG. 1 is a schematic front view of the first embodiment of the application of a dynamic absorber according to the present invention.
Figure 2:
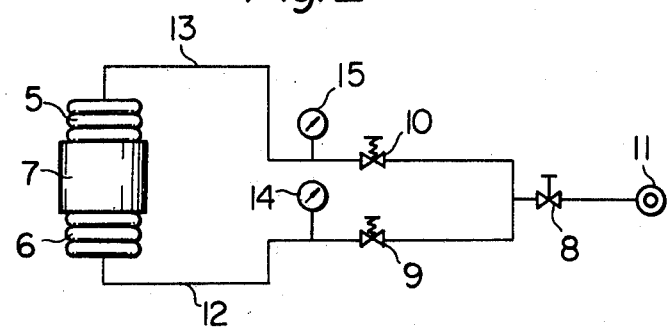
FIG. 2 is a schematic view of the pneumatic pipelines applied to the embodiment of FIG. 1.

Referring to FIGS. 1 and 2, there is shown a first embodiment of the application of the dynamic absorber of the present invention for absorbing the vibration of a machine. In the embodiment, a dynamic absorber A according to the present invention is mounted on a machine 1 which is installed on a floor 3 with intervention of elastic mounts 2, such as rubber mounts or spring mounts. Thus, the vibration occurring in the machine 1 due to some excitation force causes a resonant vibration of the dynamic absorber A so that the machine vibration is eventually cancelled by the vibration of the dynamic absorber A. The dynamic absorber A is provided with a casing 4 which is rigidly fixed on the machine 1, a pair of pneumatic springs 5 and 6 mounted in the casing 4, and a weight 7 supported between the springs 5 and 6. The weight 7 is so arranged that the center of gravity of the weight 7 moves along the path corresponding to the line of the action of the excitation force which causes the vibration of the machine 1. For example, if the machine 1 is a compressor, the vibration excitation force is generated by the reciprocal motion of the piston of the compressor. Therefore, the line of the action of the excitation force lies on the path along which the center of gravity of the piston moves. Under such condition, if the dynamic absorber A is mounted on the compressor for absorbing the vibration of the compressor, the path along which the weight 7 moves must be aligned with the above-mentioned path along which the center of gravity of the piston of the compressor moves. The pneumatic springs 5 and 6 are filled with pressurized air supplied from a pressurized air source 11 shown in FIG. 2 through pipelines 12 and 13. The outer ends of the pipelines 12 and 13 are connected to the pressurized air source 11 with the intervention of a pressure regulator S having pessure regulating valves 9 and 10 and pressure gages 14 and 15 therein, and a shut-off valve 8. It should be noted that each pneumatic spring 5 or 6 can generally be understood as an elastic means comprising a variable volume container for the pressurized air which exhibits elasticity due to the compression. Therefore, the pneumatic spring 5 or 6 may be of the bellows-type, diaphram-type, rolling seal-type or pillows-type. If preferable, an air cylinder may be used as the pneumatic spring 5 or 6. Further, it will well be understood to persons skilled in the art that the spring constant of the pneumatic spring 5 or 6 can be adjusted by controlling the internal pressure of the pneumatic spring. That is to say, the spring constant increases in response to an increase in the internal pressure. The natural frequency of the weight 7 supported between the pneumatic springs 5 and 6 can be defined by the following equation.

$$f = \frac{1}{2\pi} \sqrt{\frac{(K_5 + K_6) \cdot G}{W}}$$

where, $K_5$ and $K_6$ are the spring constants of the pneumatic springs 5 and 6, respectively, $W$ is the weight of the weight 7, $G$ is the gravity acceleration, and $f$ is the natural frequency of the weight 7. From the equation, it will be understood that if the internal pressures of both pneumatic springs 5 and 6 are increased so that the spring constants of the pneumatic sprigs 5 and 6 increase, the natural frequency $f$ of the weight 7 is in turn increased, and vice versa. As a result, it should be understood that the natural frequency $f$ of the weight 7 can freely and appropriately be adjusted by adjusting the valve openings of the pressure regulating valves 9 and 10 of the pressure regulator S. As the pressure regulator S may be positioned remotely from the dynamic absorber A, varying the natural frequency $f$ of the weight 7 of the dynamic absorber A can be remotely performed by an operator. In the first embodiment of FIG. 1, if the natural frequency of the weight 7 of the dynamic absorber A is adjusted to appropriate value in relation to the mass of the machine 1, the spring constants of the elastic mounts 2 and the frequency of the excitation force generated in the machine 1, the vibration of the weight 7 can be 180° out of phase with the vibratory change in the excitation force. As a result, the force exerted by the vibration of the weight 7 cancels the vibratory excitation force of the machine 1, so that the vibration of the machine 1 is cancelled or absorbed. However, it is often required to change the operating speed of the machine 1 in the practical use of the machine 1. Also, it often occurs that the operating speed of the machine 1 is changed by some disturbances, such as slipping of the drive motor of the machine 1. The change in the operating speed of the machine 1 causes a change in the frequency of the vibratory excitation force. As a result, when the change in the operating speed of the machine 1 occurs, it is necessary to adjust the natural frequency of the weight 7 of the dynamic absorber A. It should be appreciated that in the dynamic absorber A in accordance with the present invention, the natural frequency of the weight 7 is easily and remotely adjusted by the operator by remotely varying the internal pressures of the pneumatic springs 5 and 6. Further, in the first embodiment, completion of adjusting the internal pressures of the pneumatic springs 5 and 6 by using the pressure regulating valves 9 and 10 can be detected by monitoring the reading of a vibration detector, such as an accelerometer, which is provided with a pick up to be attached to the machine 1 on the floor 3. That is to say, the internal pressures of the pneumatic springs 5 and 6 can be adjusted by manually adjusting the pressure regulating valves 9 and 10 so that the reading of the vibration detector is at a minimum. Of course, the operator can monitor the vibration detector reading at a place remote from the dynamic absorber A. Alternately, it will be possible to automatically accomplish the adjustment of the internal pressures of the pneumatic springs 5 and 6, if a more complicated electric or electronic device is used, such as a conventional small electronic computer. On the other hand, in cases where a more simplified but rougher method will suffice, the vibration of the machine 1 may be visually monitored or monitored by the operator's sensation.

Figure 3:
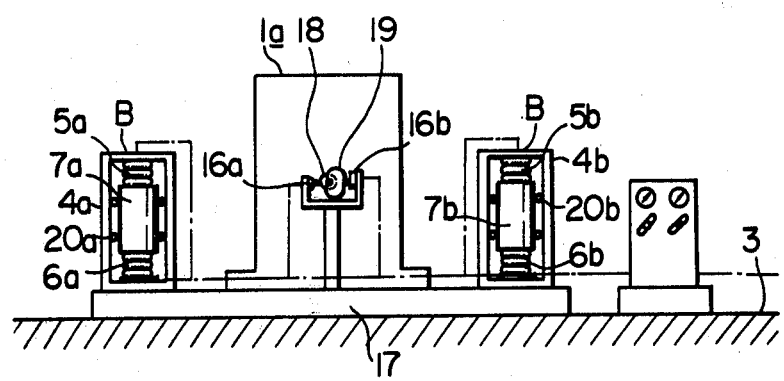
FIG. 3 is a schematic front view of the second embodiment of the application of dynamic absorbers according to the present invention.
Figure 4:
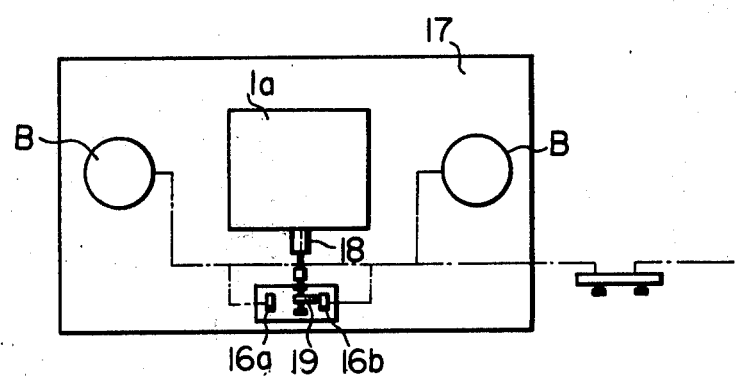
FIG. 4 is a top plan view of FIG. 3.
Figure 5:
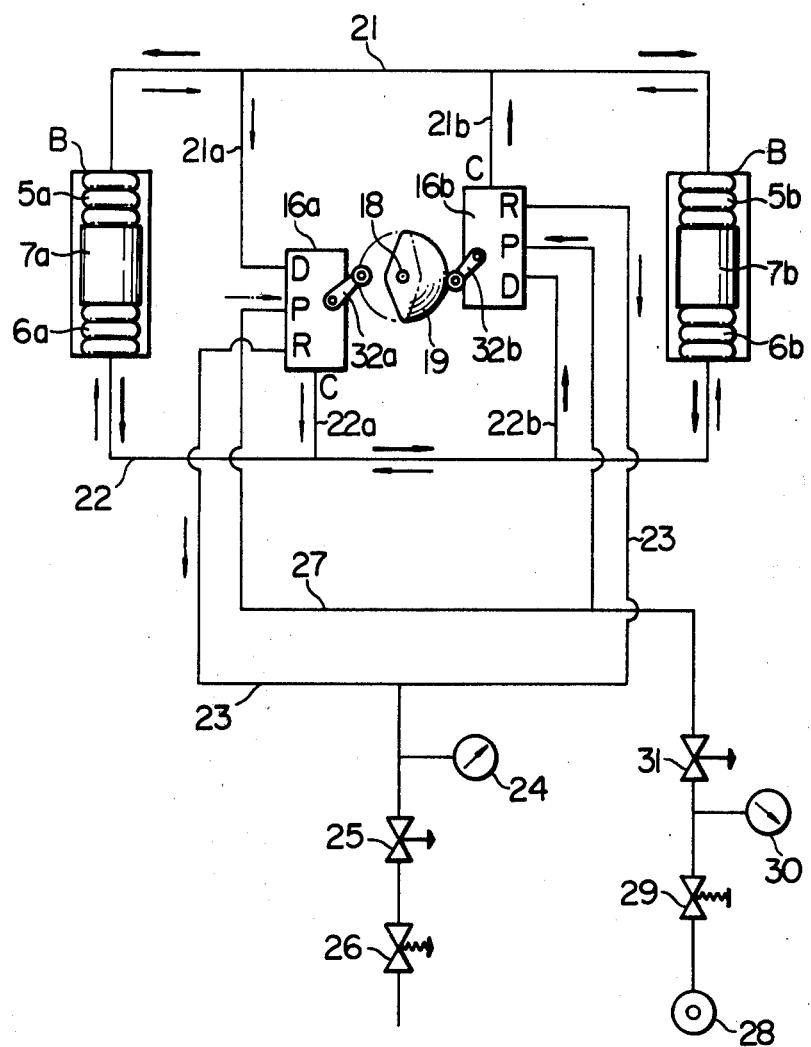
FIG. 5 is a schematic view of the penumatic pipelines applied to the second embodiment of FIGS. 3 and 4.

In the first embodiment shown in FIGS. 1 and 2, the machine 1 is mounted on the floor 3 via elastic mounts 2. However, in the case where the machine 1 is directly and rigidly fixed on the floor 3 with no intervention of elastic mounts 2, the amplitude of the vibration of the machine 1 is restricted to a very small amount. As a result, it is impossible to cause resonant vibration of the dynamic absorber A mounted on the machine 1 so as to vibrate the weight 7 of the dynamic absorber A at a large amplitude. Thus, the vibration of the machine 1 cannot completely be absorbed. The embodiment of FIGS. 3, 4 and 5 shows the case where two dynamic absorbers are employed for cancelling or absorbing the vibration of a machine 1a which is fixed on the floor 3 with intervention of a non-elastic rigid bed 17. The entire system of the embodiment of FIGS. 3, 4 and 5 is arranged in such a manner that movement of a certain machine part of the machine 1, which part operates in synchronization with the vibration of the machine 1, is used to actuate the opening and closing of directional control valves associated with the pneumatic springs of the two dynamic absorbers so as to cause alternate changes in the internal pneumatic pressures within the pneumatic springs. As a result, the weights of the dynamic absorbers are urged to cause vibrations resonant with the vibration of the machine 1a whereby the vibration of the machine 1a is eventually absorbed and cancelled.

Referring to FIG. 3, the machine 1a is mounted on the bed 17 rigidly fixed on the floor 3. The machine 1a is provided with a shaft 18 which is rotatable at a speed whose number of revolutions per minute is the same as the number of the frequency of the vibration occuring in the machine 1a in 1 minute. The machine 1a will be, for example, a conventional high speed press, a compressor and other machines whose vibrating waveforms are simple. In a high speed press machine or in a compressor, the crankshaft will be used as the shaft 18 of the machine 1a. On the rotatable shaft 18, a cam plate 19 is mounted so that the angular position of the cam plate 19 with respect to the shaft 18 is adjustable. The rotation of the cam plate 19 opens or closed directional control valves 16a and 16b which are disposed on the opposite sides of the cam plate 19. Two dynamic absorbers B are mounted on the bed 17 on which the machine 1a is also fixedly mounted. It should be noted that the two dynamic absorbers B are arranged so as to be symmetrical with respect to the center of the vibratory change in the vibration excitation force generated in the machine 1a. The two dynamic absorbers B are also positioned so as to be parallel with the line along which the vibration excitation force acts. The two dynamic absorbers B are comprised of identical elements, but for convenience sake the elements of the left dynamic absorber of FIG. 3 are identified by attaching a suffix a to the reference numerals, while the elements of the right dynamic absorber of FIG. 3 are identified by attaching a suffix b to the reference numerals. Referring to the left dynamic absorber of FIG. 3, it comprises a central weight 7a, a pair of pneumatic springs 5a and 6a supporting the weight 7a therebetween and a casing 4a for mounting the weight 7a and the pneumatic springs 5a and 6a therein. The weight 7a may be provided with rollers 20a to enable the weight 7a to move smoothly up and down within the casing 4a. As mentioned above, the right dynamic absorber B of FIG. 3 has the same construction as the left dynamic absorber B of FIG. 3. The pneumatic springs 5a, 6a, 5b and 6b, of the two dynamic absorbers B, are interconnected by a pipeline circuit for the supply and removal of pressurized air. In FIGS. 3 and 4, the pipeline diagram is shown by broken lines. The arrangement of the pipeline circuit will hereinafter be described with reference to FIG. 5. A pipeline 21 interconnects the upper pneumatic springs 5a and 5b. A pipeline 22 interconnects the lower pneumatic springs 6a and 6b. The pipeline 21 is provided with a branch 21a connected to a second outlet D of the directional control valve 16a, and another branch 21b connected to a first outlet C of the directional control valve 16b. The pipeline 22 is provided with a branch 22a connected to a first outlet C of the directional control valve 16a, and another branch 22b connected to a second outlet D of the directional control valve 16b. The two directional control valves 16a and 16b are provided with an exhaust port R, respectively, which exhaust ports are interconnected by an exhaust pipeline 23. The exhaust pipeline 23 can be opened to the atmosphere at an intermediate point between the exhaust ports R through a pressure gage 24, a flow control valve 25, and an exhaust valve 26. Preferably, the exhaust valve 26 is a safety valve which opens at a predetermined pneumatic pressure. The directional control valves 16a and 16b are also provided with a supply port P, respectively, which supply ports are connected to a pressurized air supply source 28 by way of an air supply pipeline 27 along which there are provided a pressure regulating valve 29, a pressure gage 30 and a flow control valve 31 between the supply ports P and the pressurized air supply source 28. The directional control valves 16a and 16b are further provided with actuators 32a and 32b, respectively, which are alternately actuated by the cam plate 19 on the shaft 18 so that the upper pneumatic springs 5a, 5b and the lower pneumatic springs 6a, 6b are alternately supplied with pressurized air from the supply source 28. It should be noted that when the upper pneumatic springs 5a and 5b are supplied with the pressurized air, the pressurized air in the lower pneumatic springs 6a and 6b is exhausted into the exhaust pipeline 23, and vice versa.

The operation of the embodiment shown in FIGS. 3, 4 and 5 are hereinafter explained. As shown in FIGS. 3 through 5, when the cam plate 19 mounted on the shaft 19 pushes the actuator 32b of the right directional control valve 16b and when the actuator 32a of the left directional control valve 16a is nt pushed by the cam plate 19, the pressurized air from the supply source 28 is supplied through the first outlet C of the valve 16b into the upper pneumatic springs 5a and 5b by way of the pipeline 21b and 21 as shown by thick arrows in FIG. 5. At this moment, the pressurized air in the lower pneumatic springs 6a and 6b is exhausted through the pipeline 22, the second outlet D and the exhuast port R of the directional control valve 16b, and the exhaust pipeline 23 as shown also by thick arrows in FIG. 5. The supply of the pressurized air to the upper pneumatic springs 5a and 5b and the exhausting of the pressurized air from the lower pneumatic springs 6a and 6b cause the downward movements of the weights 7a and 7b of the two dynamic absorbers B within the casings 4a and 4b, respectively. It should be noted that during the operation of the directional control valve 16b, the directional control valve 16a is maintained at its neutral position where all ports and outlets are closed. Subsequently, the cam plate 19 rotates away from the actuator 32b of the directional control valve 16b until it actuates and pushes the actuator 32a of the directional control valve 16a. As a result, the directional control valve 16b returns to the closed neutral position and the directional control valve 16a is opened. When the valve 16a is opened, the pressurized air from the pressurized air source 28 is supplied to the lower pneumatic springs 6a and 6b of the two dynamic absorbers B through air supply pipeline 27, the supply port P and the first outlet C of the valve 16a, and the pipeline 22 as shown by thin arrows in FIG. 5. At this time, the pressurized air in the upper pneumatic springs 5a and 5b is exhausted through the pipeline 21, the second outlet D and the exhaust port R of the valve 16a, and the exhaust pipeline 23. Thus, the weights 7a and 7b which were at their lowest positions are urged to move upward. From the foregoing description of the embodiment of FIGS. 3, 4 and 5, it will be understood that the combination of the two directional control valves 16a and 16b functions as a single four-way three position valve. Thus, the system of the embodiment of FIGS. 3, 4 and 5 may be modified so that the two directional control valves 16a and 16b are replaced by an appropriate single four-way three position valve. Further in the second embodiment of FIGS. 3, 4 and 5, the directional control valves 16a and 16b are operated by the mechanical actuation of the cam plate 19 pressing the actuators 32a and 32b of the two valves 16a and 16b. However, it will easily understood that electrical actuation may be employed, if conventional limit switches and electro-magnetic valves are used. It should be noted that in the embodiment of FIGS. 3, 4 and 5, the frequency of the operatin of the two directional control valves 16a and 16b is directly related to the rotation of the shaft 18 of the machine 1a. However, the above frequency of the operation of the two directional control valves 16a and 16b may be related to some other moving part of the machine 1a, if the movement of such other moving part of the machine 1a has a relation to the vibration of the machine 1a which can be predetermined.

From the foregoing, it will be understood that every time the directional control valve 16b is operated by the cam plate 19, the weights 7a and 7b of the two dynamic absorbers B move downward, and that everytime the directional control valve 16a is operated by the cam plate 19, the weights 7a and 7b move upward. That is to say, one revolution of the shaft 18 of the machine 1a causes one vibrating motion of the vibrating systems of the two dynamic absorbers B. Therefore, if the natural frequencies of the vibrating systems during a second are equal to the number of revolutions per second of the shaft 18, the vibrating systems of the two dynamic absorbers B will vibrate in resonance with the vibration of the machine 1a, so that the two weights 7a and 7b each vibrate at a large amplitude. The natural frequencies of the two vibrating systems of the two dynamic absorbers B can easily be varied and adjusted by adjusting the internal pressures of the pneumatic springs 5a, 5b, 6a and 6b, respectively, so that the spring constants of these pneumatic springs are adjusted. The adjustment of the internal pressures of the pneumatic springs can be performed by adjusting the pressure control valve 29 and the exhaust valve 26. Further, it should be noted that the forces applied to the weights 7a and 7b may be adjusted by adjusting the flow control valves 25 and 31. As previously described, the two dynamic absorbers B are disposed so as to be symmetrical to one another with respect to the line along which the excitation force generated in the machine 1a acts. Thus, the combined force of the forces applied to respective weights 7a and 7b acts along the same lines as the excitation force generated in the machine 1a. Therefore, if the above-mentioned forces applied to the weights 7a and 7b, respectively, are adjusted so as to be 180° out of phase with the vibration excitation force generated in the machine 1a, and also if the absolute value of the above-mentioned combined force of the two weights 7a and 7b is adjusted to be equal to that of the vibration excitation force generated in the machine 1a, the excitation force is cancelled by the combined force. Consequently, the force transmitted to the bed 17 and the floor 3 becomes nil. This means that the second embodiment of FIGS. 3, 4 and 5 can provide a vibration absorption effect for the machine 1a similar to the effect provided by the first embodiment of FIGS. 1 and 2. However, it should be understood that the important difference of the second embodiment from the first embodiment is that the vibration of the weights 7a and 7b of the two dynamic absorbers B in the second embodiment is caused by the forces which are produced by the pressurized air fed to the pneumatic springs 5a, 5b, 6a and 6b. That is, the vibration of the weights 7a and 7b of the dynamic absorbers B is caused without the help of the vibration of the machine 1a. Therefore, it will be understood that the second embodiment is advantageously employed in the case where generally, a machine is rigidly fixed on the foundation and, thus, the vibration amplitude of the machine is small. It should further be understood that the adjustment of the time phases of the forces applied to the weights 7a and 7b can be attained by adjusting the angular position of the cam plate 19 on the shaft 18 within the angular range of 360°, or by adjusting the disposition of the directional control valves 16a and 16b with respect to the cam plate 19 fixed on the shaft 18. In the embodiment of FIGS. 3, 4 and 5, the two dynamic absorbers are employed. However, the number of dynamic absorbers B may be more than two, if the combined force of the dynamic absorbers acts along the same line as the excitation force generated in the machine 1a. Further, a single dynamic absorber B may be employed. In the case where a single dynamic absorber B is employed, the absorber must be disposed so that the weight vibrates along the line along which the excitation force generated in the machine 1a acts. Further, the bed 17 disposed between the machine 1a and the floor 3 may be eliminated, if the dynamic absorbers B and the machine 1a are physically and dynamically connected to one another.

The embodiment of FIGS. 3, 4 and 5 may be modified as follows. Either the upper pneumatic springs 5a and 5b, of the two dynamic absorbers B, or the lower pneumatic springs 6a and 6b are filled with a predetermined amount of pressurized air so that the internal pressures thereof are always constant. Then, the opposite lower pneumatic springs 6a and 6b or the opposite upper pneumatic springs 5a and 5b are alternately connected to the pressurized air supply source 28 and to the air-exhaust pipe line 23 so that the supply of the pressurized air to the pneumatic springs and the exhaustion of the pressurized air from the pneumatic springs are alternately repeated. It will be understood that such modification allows the elimination of either the pipelines 21, 21a and 21b or the pipelines 22, 22a and 22b, and the replacement of the two directional control valves 16a and 16 with a single three-way three position valve.

Figure 6:
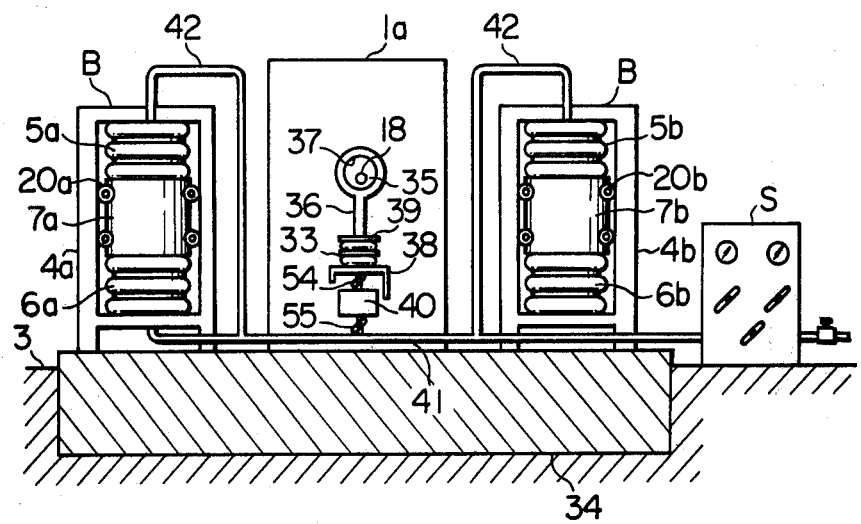
FIG. 6 is a schematic front view of the third embodiment of the application of dynamic absorbers according to the present invention.
Figure 7:
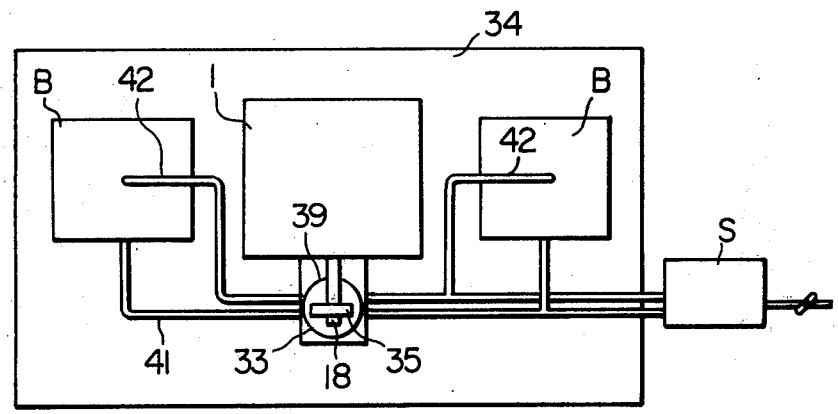
FIG. 7 is a top plan view of FIG. 7.
Figure 8:
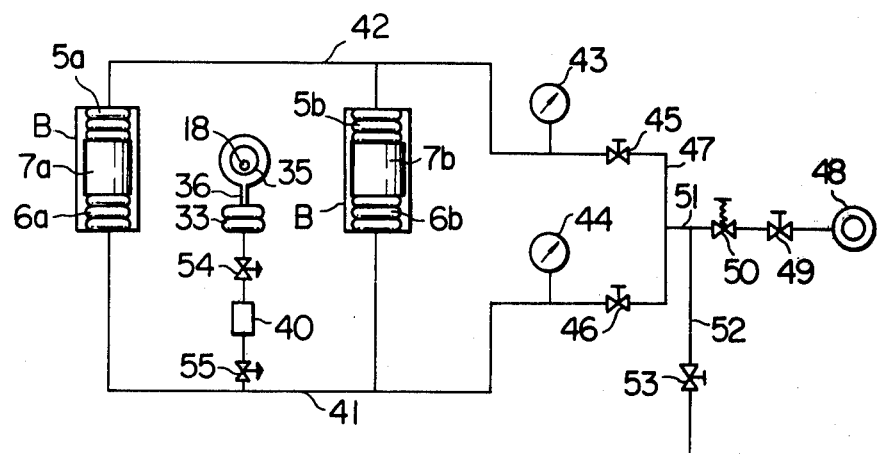
FIG. 8 is a schematic view of the pneumatic pipelines applied to the third embodiment shown in FIGS. 6 and 7.

A third embodiment of the application of the dynamic absorber according to the present invention will be described with referrence to FIGS. 6, 7 and 8. It should be noted that the principal difference of the third embodiment from the second embodiment of FIGS. 3, 4 and 5 is that a machine whose vibration is to absorbed is installed on a foundation embeded in the floor 3, and that the directional control valves 16a and 16b used in the second embodiment are replaced by a variable volume means, such as a rubber-bellows device. Therefore, in FIGS. 6, 7 and 8, the same elements or like elements are designated by the same reference numerals. In FIGS. 6, 7 and 8 a machine 1a whose vibration is to be absorbed, is mounted on a foundation 34 which is fixedly embeded in the floor 3. The shaft 18 of the machine 1a rotates at such a speed that the number of revolution is equal to the frequency of the vibration of the machine 1a. On the shaft 18, an eccentric plate 35 is mounted so that its angular position is adjustable. The eccentric plate 35 has a circular periphery on which a connecting rod 36 is rotatably fitted by means of a bore 37 of the connecting rod 36. The lower end of the connecting rod 36 is attached to an upper face plate 39 of a rubber bellows 33 which is mounted on a stationary plate mount 38. The rubber bellows 33, acting as a variable volume means, is connected to a pipeline 41 via an air reservoir 40 and flow control valves 54 and 55. The two dynamic absorbers B are disposed in the same manner as those of the second embodiment of FIGS. 3, 4 and 5. FIG. 8 shows a pipeline circuit for supplying pressurized air to the pneumatic springs 5a, 5b, 6a and 6b of the two dynamic absorbers and for exhausting pressurized air from the pneumatic springs. As shown in FIG. 8, the upper pneumatic springs 5a and 5b are interconnected by a pipeline 42, while the lower pneumatic springs 6a and 6b are interconnected by the above-mentioned pipeline 41 connected to the rubber bellows 33. Along the two pipelines 41 and 42, pressure gages 43 and 44 and choke valves 45 and 46 are disposed. The two pipelines 41 and 42 are interconnected at their ends by a connecting pipeline 47 which is connected to a pressurized air supply source 48 by way of an air supply pipeline 51 along which a pressure regulating valve 50 and a choke valve 49 are disposed. To a point adjacent to the connecting point of the pipelines 47 and 51, an exhaust pipeline 52, which has a choke valve 53, is connected. The pressure regulating valve 50 on the air supply line 51 is provided for commonly adjusting the internal pressures of the upper springs 5a and 5b and of the lower springs 6a and 6b for the purpose of adjusting the natural frequencies of the weights 7a and 7b of the two dynamic absorbers B. Instead of the common pressure regulating valve 50, two separate pressure regulating valves may be disposed on the pipeline 47 for separately adjusting the internal pressures of the upper and lower pneumatic springs. Particularly, if the two weights 7a and 7b are heavy and are arranged so as to vertically vibrate, the lower penumatic springs 6a and 6b are required to bear the large weights of the two weights 7a and 7b, respectively. Consequently, it is required that the internal pressures of the lower pneumatic springs 6a and 6b be maintained higher than those of the upper springs 5a and 5b. Thus, in order to satisfy this requirement, two pressure regulating valves, similar to the valve 50, must be disposed so as to allow separate adjustment of the internal pressures of the upper and lower pneumatic springs. The operation of the third embodiment will hereinafter be described.

When the machine 1a begins to operate, the shaft 18 starts to rotate causing rotation of the eccentric plate 35. While the eccentric plate 35 rotates, the connecting rod 36 connected to the eccentric plate 35 performs reciprocal motion in the vertical direction. The reciprocal motion of the eccentric plate 35 causes alternate expansion and contraction movements of the rubber bellows 33, which movements in turn cause the pressurized air to flow into the rubber bellows 33 from the pipeline 41, and to flow from the rubber bellows 33 into the pipeline 41. These reciprocal flows of the pressurized air vary the internal pressures of the lower pneumatic springs 6a and 6b thereby causing vibrating motions of the two weights 7a and 7b. It should be noted that, during the operation of the machine 1a, the two choke valves 45 and 46 must be closed after the internal pressures within the pipelines 41 and 42 are appropriately adjusted. As is already understood, the natural frequencies of the weights 7a and 7b depend upon the magnitude of the internal pressures of the upper and lower pneumatic springs 5a, 5b and 6a, 6b and heaviness of the two weights 7a and 7b. When the natural frequencies of the two weights 7a and 7b of the two dynamic absorbers B become equal to the number of revolutions of the shaft 18, the vibrations of the two dynamic adsorbers B become resonant with the vibration of the machine 1a and, as a result, the amplitudes of the vibrations of the two weights 7a and 7b reach peak values, respectively. Further, it should be noted that the magnitude of the opening of the two flow control valves 54 and 55 and the capacity of the air reservoir 40 determine the magnitude of the difference between the phases of the movement of the rubber bellows 33 and of the change in the internal pressure within the pipeline 41 and the lower pneumatic springs 6a and 6b. In addition, the angular position of the eccentric plate 35 on the shaft 18 determines the magnitude of the difference between the phases of the vibratin of the machine 1a and of the movement of the rubber bellows 33. Therefore, if the vibrating motions of the two weights are adjusted so as to be 180° out of phase with the vibration of the machine 1a by appropriately adjusting the above-mentioned variable components, such as the magnitude of the opening of the two flow control valves 54 and 55, the capacity of the air reservoir 40, and the angular position of the eccentric plate 35, and if the amounts of the amplitudes of the vibrations of the weights 7a and 7b are adjusted so that the absolute amount of the combined force of the individual forces applied to the two weights 7a and 7b becomes equal to the excitation force generated in the machine 1a, by also adjusting the magnitude of the opening of the flow control valves 54 and 55 along with the amount of the extension and contraction movement of the rubber bellows 33, the vibration of the machine 1a is cancelled by the vibrations of the two weights 7a and 7b of the two dynamic absorbers B. During the absorbing operation of the third embodiment, the pressurized air is not exhausted from the system into the atmosphere, since the two choke valves 45 and 46 are completely closed when the dynamic absorbers are operated. Therefore, the pressurized air can be conserved. It should be appreciated that the conservation of the pressurized air is very advantageous in the case where pressurized air is not easily obtained. The rubber bellows 33 acting as variable volume means in the third embodiment may be replaced by some other variable volume means, such as air cylinders, diaphram devices or the like. Further, the expansion and contraction movements of the rubber bellows 33 may be directly caused by a some reciprocally movable part of the machine 1a. It is possible to eliminate the air reservoir 40, if a modification is effected so that the expansion and contraction movements of the rubber bellows 33 can be caused by some machine part whose movement is appropriately out of phase with the vibration of the machine 1a. Further, it will be understood by persons skilled in the art that the amplitudes of the vibrations of the weights 7a and 7b may be adjusted by some control means other than the flow control valves 54 an 55. In a further modification, the rubber bellows 33, which is connected to the lower pneumatic springs 6a and 6b, may be connected to the upper pneumatic springs 5a and 5b, if another rubber bellows, whose expansion and contraction movements are 180° out of phase with those of the rubber bellows 33, is intervened between the bellows 33 and the upper pneumatic springs 5a and 5b. Moreover, in the third embodiment of FIGS. 6 through 8, the rubber bellows 33 acting as a variable volume means is actuated by the shaft 18 of the machine 1a via connecting rod 36. However, the actuation of the rubber bellows 33 may be actuated by some other moving means, if the movement of the moving means is synchronized with the movement of the machine 1a.

Figure 9:
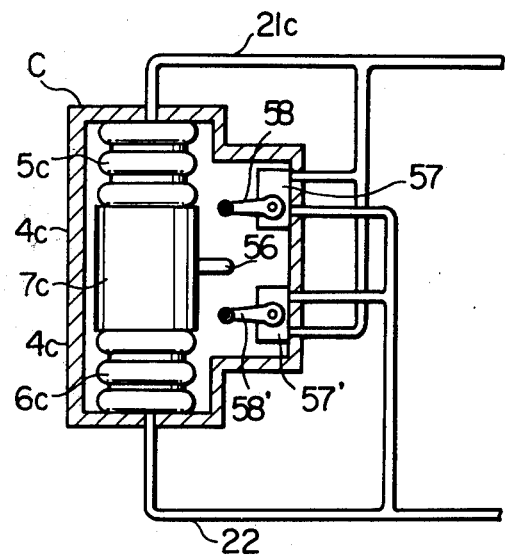
FIG. 9 is a partial and schematic view, in part cross section, of the pipelines applied to a dynamic absorber provided with an amplitude control according to the present invention.

A description of the control of the vibration amplitude, during the vibration, of the weight of a dynamic absorber according to the present invention will now be provided. FIG. 9 shows an embodiment of the system for controlling the vibration amplitude of the dynamic absorber of the present invention. In FIG. 9, a dynamic absorber C is provided with a casing 4c, two pneumatic springs 5c and 6c mounted in the casing 4c and a weight 7c supported between the two pneumatic springs 5c and 6c. Pipelines 21c and 22c are provided for supplying pressurized air into the pneumatic springs 5c and 6c, respectively, and for exhausting the pressurized air from the springs 5c and 6c, respectively. Reference numeral 56 designates a projection disposed at a central part of the weight 7c. Reference numerals 57 and 57' designate a pair of directional control valves fixed to the inside of the casing 4c. The two directional control valves 57 and 57' have actuators 58 and 58', respectively, which are so disposed that when the amplitude of the vibration of the weigtht 7c of the dynamic absorber C increases to a predetermined magnitude, the projection 56 vibrating with the weight 7c contacts and actuates actuators 58 and 58' thereby controlling the opening and closing of the two directional cotrol valves 57 and 57'. It should be noted that the two directional control valves 57 and 57' operate merely to open or close a passage of the pressurized air. The two pipelines 21c and 22c are interconnectable by means of a pair of connecting pipelines shown in FIG. 9 via the two directional control valves 57 and 57'. When either of the two actuators 58 and 58' of the valves 57 and 57' is actuated by the projection 56 of the weight 7c during the vibration of the weight 7c, the two pipelines 21c and 22 are fluidly interconnected through the opened valve 57 or 57'. On the other hand, when the two actuators 58 and 58' are both at neutral positions as shown in FIG. 9, the fluid interconnection between the two pipelines 21c and 22c is interrupted by the closed valves 57 and 57'. The above-mentioned fluid interconnection between the two pipelines 21c and 22c causes a decrease in the pressure difference between the upper and lower pneumatic springs 5c and 6c during the vibration of the weight 7c. That is to say, leakage of pressure occurs from the high pressure spring to the low pressure spring. Thus, the force causing the weight 7c to vibrate between the two pneumatic springs 5c and 6c decreases. As a result, the amplitude of the vibration of the weight 7c becomes small. It will now be understood that the amplitude control system of FIG. 9 allows the limiting of the amplitude of the vibration of the weight 7c of the dynamic absorber C to a predetermined magnitude, thereby controlling the magnitude of the vibratory force exerted by the dynamic absorber C. It will also be understood that the system of FIG. 9 is equally applicable not onle to the dynamic absorber A of the above-mentioned first embodiment but also to the dynamic abosrber B of the above-mentioned second and third embodiments. In the amplitude control system of FIG. 9, the two directional control valves 57 and 57' provided with actuators 58 and 58', respectively, may be replaced by a combination of conventional electro-magnetic valves and limit switches. That is to say, the directional control valves 57 and 57' can be replaced by electro-magnetic valves, and the actuators 58 and 58' can be replaced by limit switches. Further, in he case of the second embodiment of FIGS. 3 through 5, if two conventional limit switches are disposed so that when the amplitudes of the vibrations of the two weights 7a and 7b increases to a predetermined magnitude the limit switches are alternately actuated by some parts of the weights, the amplitude control of the vibrations of the weights will be attained by controlling the magnitudes of the openings of the flow control valves 25 and 31 by the signals from the limit switches. In the third embodiment of FIGS. 6 through 8, an identical type of amplitude control of the vibrations of the weights 7a and 7b of the two dynamic absorbers can be attained by controlling the magnitudes of the openings of the two flow control valves 54 and 55.

Figure 12:
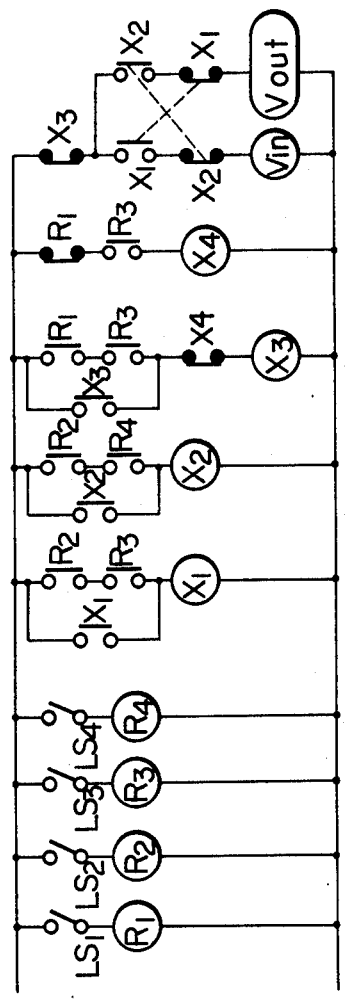
FIG. 12 is an electrical relay-circuit diagram employed in the fourth embodiment of FIG. 10.

FIGS. 10 through 12 show a fourth embodiment of the application of dynamic absorbers with pneumatic springs according to the present invention. However, it is pointed out that the fourth embodiment cann be understood as a modification of the second embodiment of FIGS. 3 through 5, because the primary difference between the two embodiments resides in the fact that the internal pressures of the pneumatic springs of the dynamic absorber employed in the fourth embodiment are automatically adjustable. Therefore, the pneumatic springs of the two dynamic absorbers of the fourth embodiment are connected to the same pipelines 21 and 22 as those of the second embodiment, which pipelines 21 and 22 are arranged so as to be the same as shown in FIG. 5. However, as shown in FIG. 11, the pressurized air supply pipeline 27 and the pressurized air exhaust pipeline 23 are connected to a four-way three position electro-magnetic valve 59 via the pressure gages 24 and 30 and flow control valves 25 and 31. The electro-magnetic valve 59 is connectable to the pressurized air source 28. That is to say, in the first position of the electro-magnetic valve 59, the supply pipeline 27 is fluidly connected to the pressurized air supply source 28 and the exhaust pipeline 23 is interrupted by the valve 59. In the second position, the supply and exhaust pipelines 27 and 23 are both interrupted by the valve 59. In the third position, the supply pipeline 27 is interrupted, but the exhaust pipeline 23 is opened to the atmosphere by way of the valve 59. In FIG. 10, and in FIGS. 13 and 14 which are partially enlarged cross-sectional views of the parts E and F of FIG. 10, respectively, a projection 60 of the weight 7a actuates a limit switch LS1 so as to be turned ON, when the weight 7a is positioned at its central position. The limit switch LS1 is fixed to the casing 4a and provided with an actuator 68 having a roller 68a cooperable with the projection 60 of the weight 7a. The limit switch LS1 is also provided with electrical wires 69. An arm 63 is supported by upper spring 61 and lower spring 62, which are attached to upper and lower parts of the weight 7a at the upper and lower ends, respectively. The arm 63 is pivotal on a pivot 64 attached to casings 4a. The pivotal motion of the arm 63 is restricted by two stops 65 and 66 which are fixed to the casing 4a. An outer free end of the arm 63 contacts a plunger-type actuator 70 of a limit switch LS2 attached to the casing 4a. The limit switch LS2 has an electrical lead line 71. The reference numeral 72 designates a covering for the limit switch LS2. As understood from FIG. 14, when the weight 7a vibrates, the arm 63 pivots about the pivot 64. Therefore, the plunger-type actuator 70 of the limit switch LS2 is pressed in by the free end of the arm 63 and the limit switch LS2 becomes ON when the weight 7a moves downward from the central position during its vibrating motion. Mounted on the shaft 18 in FIG. 10 is a cam plate 67 which is different from the cam plate 19 of FIG. 5. At diametrically opposite positions on a line perpendicular to the axis of the shaft 18, two limit switches LS3 and LS4 are attached to the machine 1a by means of brackets 73 and 74, respectively. Therefore, during every half revolution of the cam plate 67, the limit switches 73 and 74 are alternately actuated by the cam plate 67 so that the two limit switches alternately become ON. In FIG. 12, which shows an electrical interlocking circuit for the fourth embodiment, the above-mentioned four limit switches LS1 through LS4 are arranged in parallel with one another. R1 through R4 and X1 through X4 of FIG. 12 designate relays, respectively, and $V_{in}$ and $V_{out}$ designate excitation coils for the above-mentioned electro-magnetic valve 59. When the excitation coil $V_{in}$ is excited, the electro-magnetic valve 59 moves to the above-mentioned first position, while when the excitation coil $V_{out}$ is excited, the valve 59 moves to the above-mentioned third position. When both excitation coils $V_{in}$ and $V_{out}$ are de-energized, the electro-magnetic valve 59 stays at its seccond position where the pressurized air supply and exhaust pipelines 27 and 23 are interrupted by the valve 59 as previously mentioned. Generally, if the natural frequency of the weight 7a is less than the vibration frequency of the machine 1a, that is to say, if the internal pressures of the pneumatic springs 5a and 5b are lower than an appropriate pressure value, respectively, the vibration of the weight 7a supported between the pneumatic springs 5a and 6a is 180° out of phase with the phase of the vibratory force which is exerted by the two pneumatic springs when the rotation of the shaft 18 of the machine 1a causes alternate supply of the pressurized air to the two pneumatic springs 5a and 6a. On the other hand, if the internal pressures of the pneumatic springs 5a and 6a are higher than the appropriate value, the phase of the vibration of the weight 7a is approximately equal to the phase of the above-mentioned vibratory force. Further, when the vibration of the weight 7a is resonant with the vibration of the machine 1a, the phase between the two vibrations is 90°. In the fourth embodiment, if the angular position of the cam plate 67 on the shaft 18 is appropriately selected, and if disposition of the two limit switches LS3 and LS4 are appropriate, it is possible to obtain such a condition that the two limit switches LS2 and LS3 are simultaneously ON when the vibration of the weight 7a is 180° out of phase with the phase of the vibratory force exerted by the pneumatic springs 5a and 6a, to which the pressurized air is alternately supplied in response to the rotation of the shaft 18 of the machine 1a, and that the two limit switches LS2 and LS4 are simultaneously ON when the phase of the vibration of the weight 7a is equal to the phase of the above-mentioned vibratory force. When the above-mentioned condition is obtained, it will be understood that when the vibration of the weight 7a is resonant with the vibration of the machine 1a, the two limit switches LS1 and LS3 are both turned ON, since the limit switch LS1 becomes ON due to actuation by the projection 60 when the weight 7a is at the central position thereof.

If a case is now assumed where the internal pressures of the pneumatic springs 5a and 6a are lowered so that the natural frequency of the weight 7a is appreciably less than the vibration frequency of the machine 1a, the limit switch LS2 actuated by the arm 63 and the limit switch LS3 actuated by the cam plate 67 are both turned ON while the weight 7a is moved downward from the central position thereof. When the two limit switches LS2 and LS3 are ON, the associated relays R2 and R3 are energized, so that the relay X1 is energized. As a result, the excitation coil $V_{in}$ is excited so that the electro-magnetic valve 59 moves to its first position where the pressurized air flows from the pressurized air source 28 into the supply pipeline 27. Thus, the pneumatic springs 5a and 6a are in turn supplied with the pressurized air through the supply pipeline 27 so that their internal pressures is increased. The increase in the internal pressures of the two pneumatic springs 5a and 6a increases the natural frequency of the weight 7a and eventually makes the natural frequency of the weight 7a be tuned to the vibration frequency of the machine 1a. As a result, the rotation of the cam plate 67, attached to the shaft 18 of the machine 1a, is 90° out of phase with the vibrating motion of the weight 7a. Therefore, there occurs a condition where when the limit switch LS1 is turned ON, the limit switch LS3 is simultaneously turned ON. Thus, the associated relays R1 and R3 are simultaneously energized, so that the relay X3 is energized. The energization of the relay X3 releases the excitation of the excitation coil $V_{in}$ as understood from FIG. 12. As a result, the electro-magnetic valve 59 moves to the second position thereof whhere the pressurized air supply and exhaust pipelines 27 and 23 are together interrupted by the valve 59. If there occurs a case where the internal pressures of the pneumatic springs 5a and 5b are excessively high for some reason, the phase of the vibration of the weight 7a becomes the same as the phase of the rotation of the cam plate 67 attached to the shaft 18 of the machine 1a. Therefore, when the limit switch LS2 is turned ON, the limit switch LS4 is also turned ON. As a result, the associated relays R2 and R4 are simultaneously energized, so that the relay X2 is energized. The energization of the relay X2 brings about excitation of the excitation coil $V_{out}$ thereby moving the electro-magnetic valve 59 to the third position thereof where the air exhaust pipeline 23 is opened to the atomsphere through the valve 59. The opening of the air exhaust pipeline 23 causes a decrease in the internal pressures of the pneumatic springs 5a and 6a. When the internal pressures of the pneumatic springs 5a and 6a are decreased until the vibration of the weight 7a becomes resonant with the vibration of the machine 1a, the electro-magnetic valve 59 is again moved to the second position thereof where, as mentioned previously, the pressurized air supply and exhaust pipelines 27 and 23 are together interrupted by the valve 59. If the vibration of the weight 7a becomes non-resonant with the vibration of the machine 1a for any reason, the limit switch LS3 is turned ON while the limit switch LS1 is turned OFF. Therefore, while the relay R1 is de-energized, the relay R3 is energized. As a result, the relay X4 is energized causing the relay X3 to be de-energized. When the relay X3 is de-energized, either the excitation coil $V_{in}$ or $V_{out}$ becomes excitable so that the electro-magnetic valve is moved to the first position thereof or to the third position thereof. Further, if leakage of the pressurized air from the pneumatic springs 5a and 6a occurs during a stoppage of the dynamic absorber B, the weight 7a moves down from the central position thereof. Therefore, when the dynamic absorber starts to operate, the limit switch LS2 is turned ON, and supply of the pressurized air to the pneumatic springs 5a and 6a is immediately commenced in the same manner as the previously mentioned case where the internal pressures of the pneumatic springs are low. Alternately, the leakage of the pressurized air from the pneumatic springs may be detected by some appropriately arranged pressure switches. From the foregoing, it will be understood that according to the employment of the fourth embodiment, the internal pressures of the pneumatic springs 5a and 6a are automatically adjusted so that the vibration of the weights 7a is always maintained resonant with the vibration of the machine 1a.

The above description is directed to the automatic adjustment of the internal pressures of the pneumatic springs of the left dynamic absorber B in FIG. 10. Naturally, the same automatic adjustment of the internal pressures of the pneumatic springs is performed for the right dynamic absorber B in FIG. 10. Further, similar automatic adjustment of the internal pressures of the pneumatic springs can be carried out for the dynamic absorbers employed in the first and third embodiments as described hereinbefore. Also, various modifications of the pipeline arrangement and the electrical circuit shown in FIGS. 11 and 12 can be carried out.

From the foregoing description directed to several embodiments of the application of the dynamic absorber according to the present invention, it should be understood that the following particularly advantageous effects are obtained.

1. Adjustments of the natural frequency and the vibration amplitude of the dynamic absorber according to the present invention are quite simply carried out by adjusting the magnitude of the pressure and the amount of flow of the air supplied to the pneumatic springs of the dynamic absorber.

2. The above adjustments of the natural frequency and the vibration amplitude are carried out at a place remote from the dynamic absorber.

3. The simplicity of the adjustments of the natural frequency and the vibration amplitude of the dynamic absorber allows the immediate transfer of the dynamic absorber according to the present invention from one machine to a different machine. Thus, one dynamic absorber according to the present invention is applicable to a wide variety of machines. This fact can widen the demand for the dynamic absorber of the present invention with certainty. Therefore, it is possible to mass produce the dynamic absorber, and as a result, the manufacturing cost for each dynamic absorber of the present invention can be cheap.

4. Since the vibration of the dynamic absorber according to the present invention can be caused by alternate supplying of the pressurized air to the pneumatic springs, said dynamic absorber is applicable to damping the vibration of the machine which is rigidly fixed on a floor or a foundation.

What is claimed is:

1. A dynamic absorber adaptd for use in cancelling a vibration of a machine which is caused by a vibration excitation force generated in the machine, comprising:
   a pair of pneumatic means each including an elastically variable volume container disposed to be spaced apart from one another and effecting a spring action along a predetermined line, respectively;
   a weight means supported between said pair of pneumatic means and capable of vibrating between said pair of pneumatic means along said predetermined line;
   an air pipeline circuit connectable to a pressurized air source for supplying pressurized air from said pressurized air source to said pneumatic means, and;
   at least one pressure regulating valve disposed in the air pipeline circuit for remotely and adjustably regulating the pressure of the pressurized air supplied to said pneumatic means.

2. A dynamic absorber as set forth in claim 1, further comprising:
   at least one directional control valve disposed in said air pipeline circuit, the directional control valve effecting alternate supply of said pressurized air into said pair of pneumatic means upon being actuated;
   means for actuating said directional control valve at the same frequency as the frequency of said vibration excitation force of the machine thereby causing said weight means to vibrate at the same frequency as said frequency of said vibration excitation force, and;
   means for adjusting said vibration of said weight means so that it is 180° out of phase with the vibration of said machine.

3. A dynamic absorber as set forth in claim 2, further comprising:
   means for detecting a predetermined magnitude of the vibration amplitude of said weight means during said vibration of said weight means, and;
   means for effecting a decrease in pressure difference between said pair of pneumatic means upon detection of said predetermined magnitude of said vibration amplitude of said weight means, thereby causing a decrease in said vibration amplitude of said weight means.

4. A dynamic absorber as set forth in claim 3, wherein said means for effecting a decrease in pressure difference comprises two directional control valves which are alternately actuated to interconnect between said pair of pneumatic means in response to the detection of said predetermined magnitude of said vibration amplitude of said weight means.

5. A dynamic absorber as set forth in claim 1, further comprising:
   a volume variable means connected to at least one of said pair of pneumatic means, said volume variable means causing alternate changes in the internal pressure of the pneumatic means connected to said volume variable means;
   means for causing a volume change of said volume variable means at the same frequency as the vibration frequency of the machine, thereby vibrating said weight means at the same frequency as the vibration frequency of said machine, and;
   means for adjusting said vibration of said weight means so that it is 180° out of phase with the vibration of said machine.

6. A dynamic absorber as set forth in claim 1, further comprising means for detecting a predetermined magnitude of the amplitude of said vibration of said weight means, and;
   means for effecting a decrease in pressure difference between said pair of pneumatic means in response to the detection of said predetermined amplitude of said vibration of said weight means.

7. A dynamic absorber as set forth in claim 6, wherein said pressure difference decrease means comprises two directional control valves which are alternately operated to interconnect between said pair of pneumatic means in response to the detection of said predetermined magnitude of the vibration of said weight means.

8. A dynamic absorber as set forth in claim 1, further comprising;
   a first detecting means for detecting the vibration phase of said weight means;
   a second detecting means for detecting the phase of the movement of an element which moves in a predetermined retationship with the vibration of the machine, and;

means for selectively effecting an increase and decrease in the internal pressure of said pneumatic means in response to the phase difference detected by said first and second detecting means.

9. A dynamic absorber as set forth in claim 8, wherein said means for selectively effecting an increase and decrease in the internal pressures of said pneumatic means comprises an electro-magnetically operated directional control valve having at least two valve positions for introducing the pressurized air from said pressurized air source into said pneumatic means and for removing the pressurized air from said pneumatic means.

10. A dynamic absorber as set forth in claim 9, wherein said electro-magnetically operated directional control valve has a further valve position, in addition to the previously defined two valve positions, the further valve position of said valve being effective for preventing said internal pressures of said pneumtic means from being changed when said phase difference detect by said first and second detecting means is at a predetermined value.

11. A dynamic absorber as set forth in claim 10, wherein said first detecting means comprises a plurality of limit switches disposed at predetermined positions, respectively adjacent to said weight means, and wherein said second detecting means comprises a plurality of limit switches disposed at preselected positions, respectively adjacent to said machine, said limit switches of said first and second detecting means being electrically associated with an excitation circuit means for said electro-magnetically operated directional control valve.

12. A method for arranging at least a dynamic absorber as set forth in claim 1 for cancelling a vibration of a machine which is caused by a vibration excitation force generated in the machine, comprising the steps of:

detecting a line along which the vibration excitation force of said machine acts, and;

positioning the dynamic absorber on said machine so that the predetermined line, along which said weight means of said dynamic absorber vibrates, is aligned with said line along which the vibration excitation force acts.

* * * * *